(12) United States Patent  (10) Patent No.: US 7,797,977 B2
Lebbin, Jr.  (45) Date of Patent: Sep. 21, 2010

(54) SYSTEM FOR PRODUCING A HELICAL STATOR

(75) Inventor: Richard A. Lebbin, Jr., Kenosha, WI (US)

(73) Assignee: Tempel Steel Company, Chicago, IL (US)

( * ) Notice: Subject to any disclaimer, the term of this patent is extended or adjusted under 35 U.S.C. 154(b) by 0 days.

(21) Appl. No.: 12/509,958

(22) Filed: Jul. 27, 2009

(65) Prior Publication Data

US 2009/0308126 A1  Dec. 17, 2009

Related U.S. Application Data

(62) Division of application No. 11/776,656, filed on Jul. 12, 2007, now Pat. No. 7,603,760.

(51) Int. Cl.
*B21F 3/02* (2006.01)

(52) U.S. Cl. ............... 72/135; 72/137; 72/168; 29/605

(58) Field of Classification Search ............ 72/66, 72/135, 136, 137, 145, 166, 168, 169; 29/596, 29/598, 605
See application file for complete search history.

(56) References Cited

U.S. PATENT DOCUMENTS

| | | | |
|---|---|---|---|
| 1,920,155 A | * 7/1933 | Fisher | ............ 72/132 |
| 1,920,354 A | * 8/1933 | Carpenter | ............ 310/216.041 |
| 3,243,623 A | 3/1966 | Hart | |
| 3,283,399 A | * 11/1966 | Hart et al. | ............ 29/605 |
| 3,577,851 A | * 5/1971 | Detheridge et al. | ............ 29/596 |
| 3,845,647 A | 11/1974 | Cockin | |
| 4,102,040 A | * 7/1978 | Rich | ............ 29/598 |
| 4,395,815 A | 8/1983 | Stanley et al. | |
| 4,909,057 A | 3/1990 | Fritzsche | |
| 5,827,166 A | 10/1998 | Cestonaro et al. | |
| 6,792,673 B2 | 9/2004 | Barrera et al. | |

* cited by examiner

*Primary Examiner*—Edward Tolan
(74) *Attorney, Agent, or Firm*—Schiff Hardin LLP

(57) ABSTRACT

In a system for producing a helical stator, a stator core strip is provided having a base portion with spaced tangs extending from the base portion. The strip is driven in a feed direction toward a bending region. At the bending region the strip is bent with an outside pressure member positioned to apply pressure at an outside edge of the strip base portion and with an inside pressure wheel having a plurality of teeth. A backstop surface of the teeth contact an inside edge of the base portion between adjacent tangs to support the base portion as the strip is bent by the outside pressure member. A winding arbor receives the bent strip to collect multiple turns of the bent strip to form the helical stator.

18 Claims, 3 Drawing Sheets

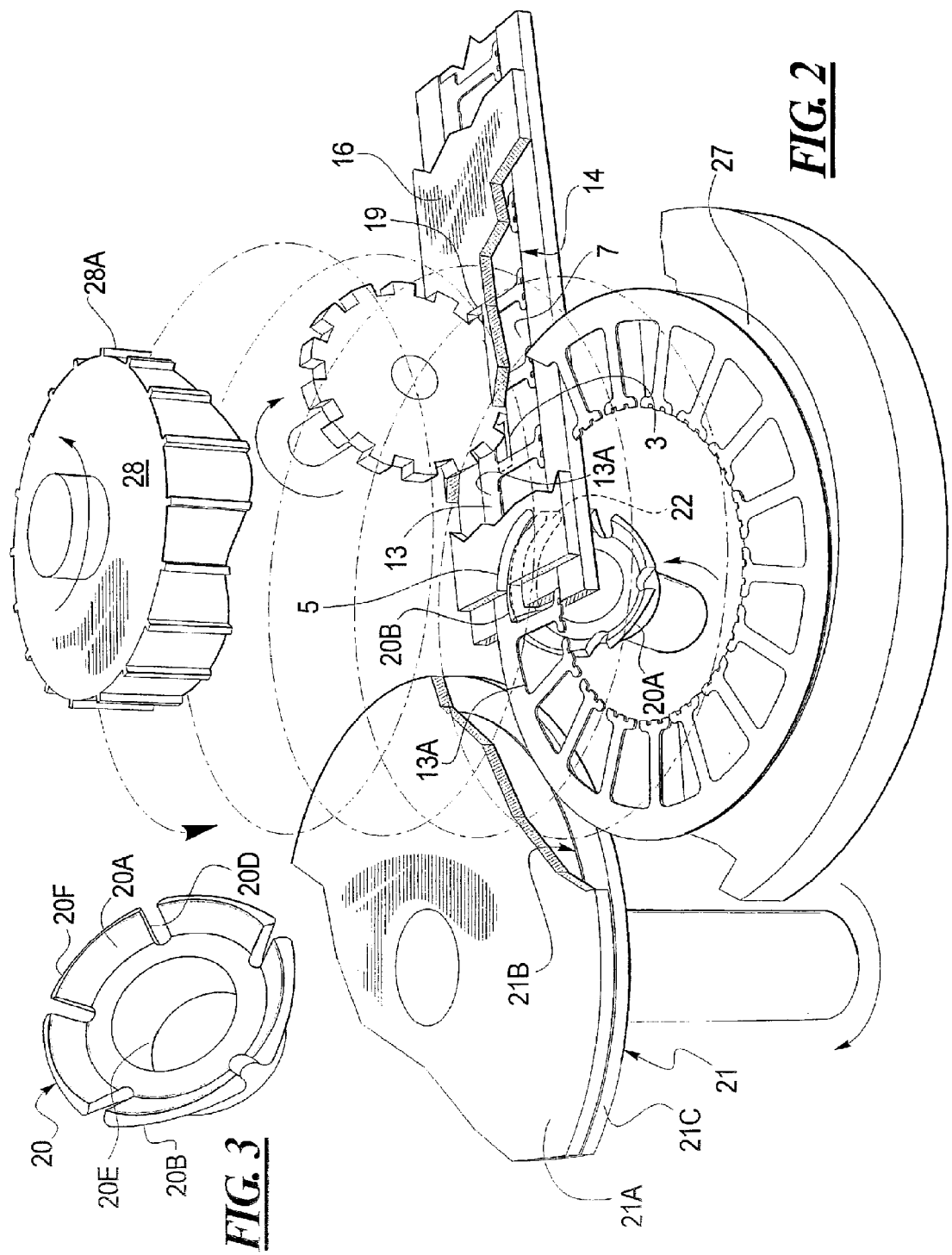

SYSTEM FOR PRODUCING A HELICAL STATOR

RELATED APPLICATION

The present application is a divisional of U.S. application Ser. No. 11/776,656 now U.S. Pat. No. 7,603,760, filed Jul. 12, 2007 entitled Method For Producing A Helical Stator.

BACKGROUND

It is known to provide a stator core for a motor or alternator which is formed by a stamped helically wound continuous strip. The advantage over a non-helical stator with discrete stacked laminations is less scrap. With a layered lamination stator comprising a plurality of stacked laminations, the center of each lamination becomes scrap material. By stamping a strip and then helically winding that strip, however, there is less scrap loss since only regions between tangs of the stator strip are lost and also perhaps a small scrap strip where the opposite sides of the strip are stamped.

In a known method for helically winding a strip for a motor or alternator stator core, it was known to provide an inside pressure wheel which would contact outer ends of tangs of the strip, along with an outside pressure wheel contacting a base portion of the strip. A disadvantage with this known method is that if the tangs are not short, thick, and closely spaced, or the base portion of the strip is too narrow, the tangs can be bent and deformed when the outside pressure wheel applies pressure on the ends of the tangs in a direction of a longitudinal extent of the tang as the strip is being bent.

SUMMARY

It is an object to improve upon the manufacture of a helical core stator for a motor or alternator, such that tangs of a strip used for the helically wound stator core are not deformed.

In a system for producing a helical stator, a stator core strip is provided having a base portion with spaced tangs extending from the base portion. The strip is driven in a feed direction toward a bending region. At the bending region the strip is bent with an outside pressure member positioned to apply pressure at an outside edge of the strip base portion and with an inside pressure wheel having a plurality of teeth. A backstop surface of the teeth contact an inside edge of the base portion between adjacent tangs to support the base portion as the strip is bent by the outside pressure member. A winding arbor receives the bent strip to collect multiple turns of the bent strip to form the helical stator.

BRIEF DESCRIPTION OF THE DRAWINGS

FIG. 2 is a perspective view showing certain operative elements of the method and apparatus of FIG. 1;

FIG. 3 is a perspective view of a toothed inside pressure wheel employed in FIGS. 1 and 2.

DESCRIPTION OF THE PREFERRED EMBODIMENT

Figure 1:
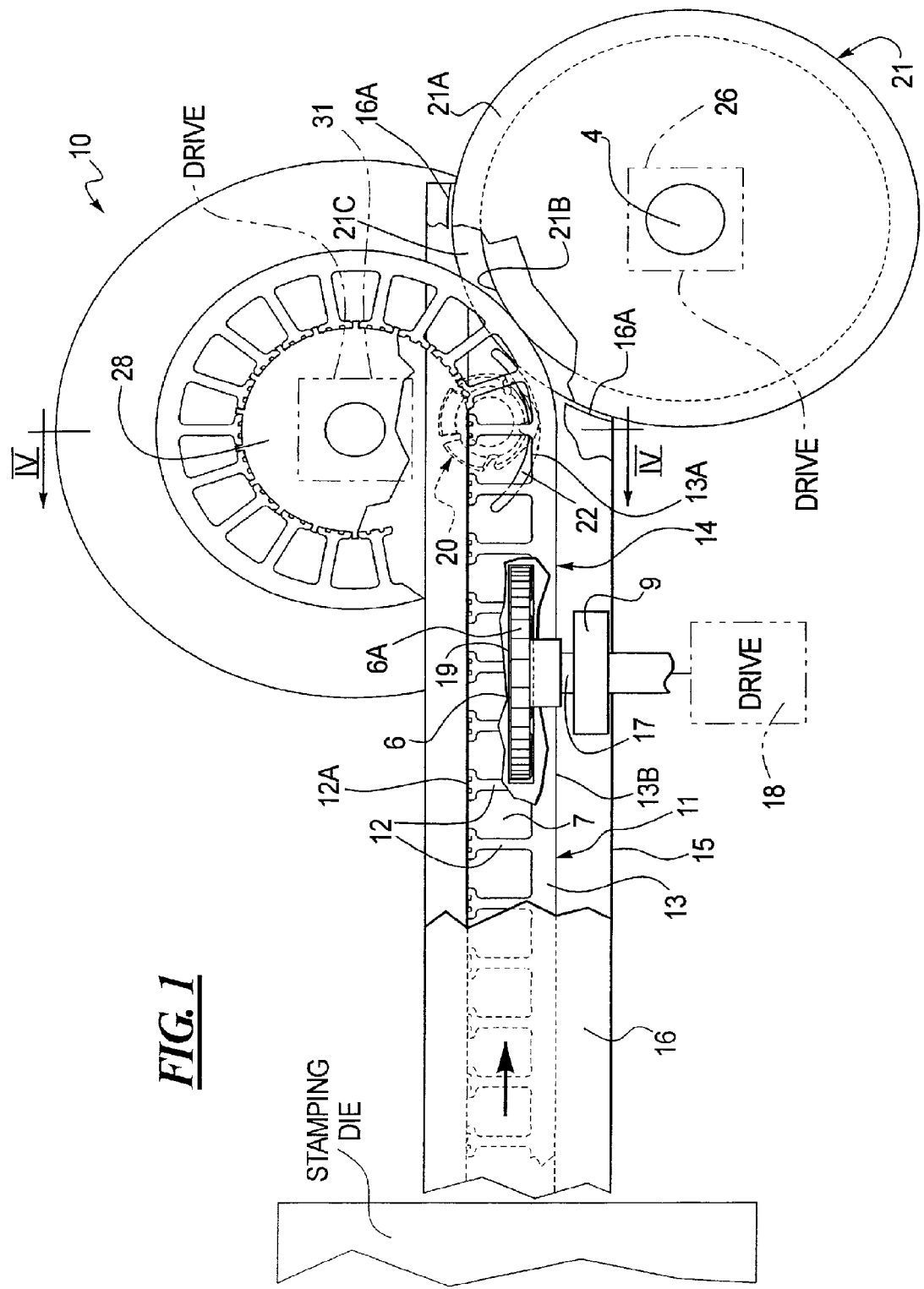
FIG. 1 is a plan view of a method and apparatus for helically winding a stator core from a continuous strip.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

A method and apparatus or system for producing a helical stator is generally shown in plan view at 10 in FIG. 1. A continuous strip of electrical steel is punched in a stamping die 8 to create a stator core strip 11. The strip 11 comprises spaced tangs 12, each having a broadened face 12A, and which project from a base portion 13 of the strip. The strip lies in a channel 14 of a strip guide plate 15. The channel 14 is covered by a cover plate 16. The channel has a thickness from a floor 7 to an inside surface of the cover plate which is slightly greater than a thickness of the strip 11.

The strip is moved in a feed direction by use of a strip feed wheel 6 having teeth 6A. The wheel 6 thus acts like a gear with the teeth 6A interacting with the tangs 12 to drive the strip forward in the apparatus. The feed wheel 6 is driven via a shaft 17 supported in a bearing block 9 by a drive 18. A slot 19 in the cover plate 16 shown in FIGS. 1 and 2 allows the teeth 6A of the feed wheel 6 to pass down through the cover plate 16 to engage in the regions between the tangs and to exert a force against the trailing edge of the tangs to drive the strip forward. A slot 3 (not visible in FIG. 1 but shown in FIG. 2) is also provided in floor 7 of channel 14 in line with slot 19 as clearance for teeth 6A.

The bending process is accomplished by a toothed and angled inside pressure wheel 20 and an outside pressure wheel 21. A vertical surface 20B (shown in FIGS. 2 and 4) at an outer periphery of each tooth 20A of the inside pressure wheel 20 extends upwardly through a curved or arcuate slot 22 in the floor 7 (FIGS. 1, 2) of channel 14 and serve as a pressure backstop for inside edge 13A of base portion 13 of strip 11 (see also FIGS. 2 and 4). A similarly arcuate slot 5 in line with slot 22 is also provided in cover plate 16 as clearance for teeth 20A. The vertical positioning of backstop surface 20B (see also FIG. 3) is achieved by the design of pressure wheel 20 and by angling a central axis 20C of shaft 23, such as 30° from vertical, for example. This is indicated by angle 24 in FIG. 4.

An outer edge 13B of strip base portion 13 is in pressure contact with an inner rim 21B of outside pressure wheel 21. As shown in FIG. 2 the outside pressure wheel 21 also has top and bottom circular plates 21A and 21C spaced a distance slightly greater than the thickness of the strip 11 and which overlap the strip base portion 13.

Significantly, gaps 20D (FIG. 3) between teeth 20A of the inside pressure wheel 20 permit engagement of the leading side edges of the teeth 20A with trailing side edges of the tangs 12. The inside pressure wheel 20 is not driven by the shaft on which it is mounted, but rather turns freely as the tangs push against the teeth, with the respective tangs being received in the respective gaps 20D between the teeth 20A of wheel 20.

Figure 4:
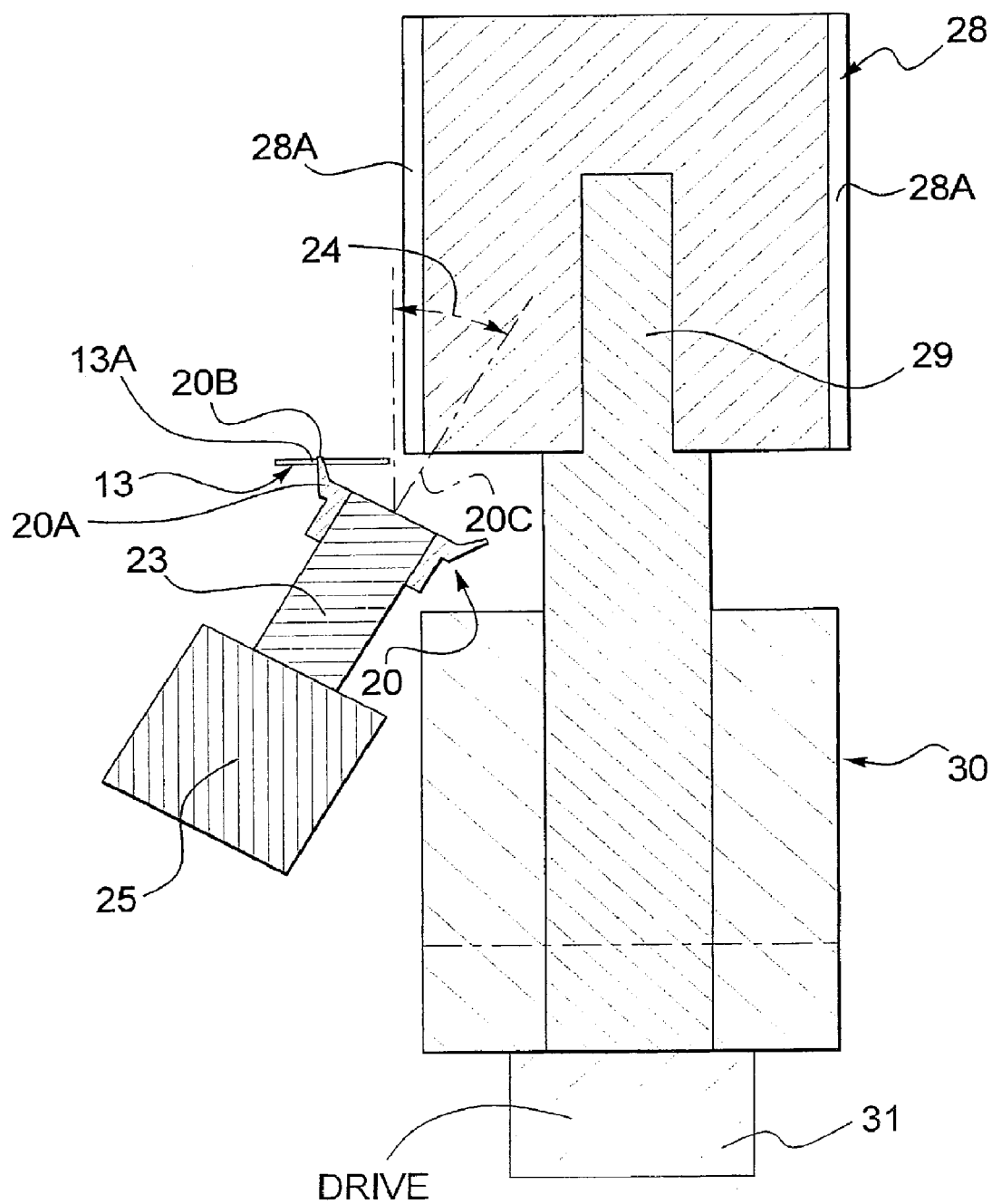
FIG. 4 is a sectional view showing some of the components of FIG. 1 taken along line IV-IV in FIG. 1.

As shown in FIG. 4, the shaft 23 is received in a bearing block 25. FIG. 4 also shows the angle of inclination 24 of the axle 23 relative to vertical, which is preferably 30° in this embodiment. Also FIG. 4 clearly shows how the inner edge 13A of base portion 13 of the strip strikes the vertical surface 20B at the outside periphery of each tooth 20A of inner pressure wheel 20.

As shown schematically in FIG. 1, the outside pressure wheel 21 is rotatably driven by a drive 26 by a shaft 4.

After the strip 13 has been bent by the inside and outside pressure wheels 20 and 21, it is deflected upwardly slightly by an inclined ramp 27 (FIG. 2) and then begins winding around an arbor 28 having teeth 28A. This arbor is shown in fragmentary view in FIG. 2 at the top, but also in cross-sectional view in FIG. 4. The arbor is driven by a shaft 29 mounted in bearing block 30. A drive 31 rotates the shaft 29 and thus the arbor. As the arbor turns, the helical winding of the stator, with the arbor teeth 28A between the widened tang faces, is thus built up on the arbor until the stator desired height has been reached, at which time the strip is cut off and no further winding occurs.

When the teeth 28A of the arbor engage between the tang end faces 12A, the helical winding process occurs after the bending process described above.

The inside pressure wheel 20 is also shown in perspective view in FIG. 3 where the teeth 20A and gaps 20D between the teeth are illustrated. The peripheral length of each tooth 20A at the backstop surface 20B substantially corresponds to a length of the spacing between the tangs 12 at the strip base portion inside edge 13A. This inside pressure wheel is mounted on shaft 23 mounted in bearing block 25 as shown in FIG. 4. Inside pressure wheel 20 is formed not only of the teeth 20A but also of a circular base portion 20E from which the teeth 20A extend in an upwardly angled or transverse direction. The wheel 20 is designed such that, with the shaft 23 arranged at a 30° angle relative to vertical, the outside backstop surface 20B near the upper peripheral edge 20F of the teeth is vertical. Also by angling the shaft 23, the upper edge of each respective tooth 20A extends up through the slot 19 in the floor 7 as the tooth rotates up to and then past the slot.

The cover plate 16 shown in FIG. 1 extends laterally to near the outside pressure wheel 21 peripheral surface and has a conforming circular arc segment 16A shown in FIG. 1 conforming to the outer periphery of the outside pressure wheel 21, and more particularly to the outer circumference of the disks 21A and 21C. Thus the strip is entrained between the cover plate 16 and the floor 7 of channel 14 of plate 15 throughout the bending process so that steel "ripples" or "folds" are minimized at the base portion 13 of strip 11.

It will be appreciated that the inside pressure wheel 20 supports the base portion 13 during the bending forces exerted by the outside pressure wheel 21. It should further be noted that the inside pressure wheel 20 does not exert a radial pressure on the tangs during the bending process, so that the tangs are not deformed in an undesirable fashion. Further, the gaps 20D between the teeth 20A in the inside pressure wheel receive the tangs 12 during the bending of the strip, these tangs driving the inside pressure wheel to rotate freely since the inside pressure wheel mounting shaft is free to rotate.

With the apparatus and method of the preferred embodiment, helical stator cores can be manufactured with relatively long and thin tangs with relatively narrower base portions supporting the tangs since radial forces, that is forces acting along the longitudinal extent direction of the tangs, are substantially not present. The creation of such helical wound stators having relatively long and thin tangs allows for additional winding wire to be employed in the gaps or coil areas between the tangs, thus permitting larger horsepower motors or alternators to be manufactured with stators constructed of helically wound cores.

The drive 18 for the strip feed wheel 6, drive 26 for the outside pressure wheel 21, and drive 31 for the winding arbor 28, have only been shown schematically. These drives are synchronized with one another. The form and structure of these drives and the method of synchronization has not been described in detail since various different kinds of synchronization or drives can be employed and are well known by one skilled in the art such as gears, belts, synchro-motors, and electronic control of the various drives.

The strip feed wheel 6 may take various forms and other types of strip drives may be employed. Similarly, other shapes and designs may be employed for the outside pressure wheel 21 and for the inside pressure wheel 20. Similarly the winding arbor may have various designs and shapes. Finally, the strip guide plate 15 with its channel 14 and the cover plate 16 may also be designed in other ways to accomplish appropriate confinement of the strip as it is being bent to provide the helical winding. Also, the bearing blocks for the shaft of the inside pressure wheel and the shaft of the outside pressure wheel may take various forms and may be located in different regions. Also the bearing block 9 for the shaft 17 of the strip feed wheel 6 may be located at different regions.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim:

1. A system for producing a helical stator, comprising:
    a stamping die which receives a metal strip and outputs a stator core strip having a base portion and spaced tangs extending from the base portion;
    a guide receiving said stator core strip;
    a strip feed wheel having teeth engaging the stator core strip to drive the stator core strip in a feed direction to a bending region;
    at said bending region an outside pressure member positioned to apply pressure at an outside edge of said strip base portion and with an inside pressure wheel having a plurality of teeth, a backstop surface of said teeth positioned to contact an inside edge of said base portion between adjacent tangs to support said base portion as the strip is being bent by said outside pressure member, said inside pressure wheel having gaps between said teeth and for receiving said tangs; and
    a winding arbor receiving the bent strip to collect multiple turns of said bent strip to form said helical stator.

2. A system of claim 1 wherein said outside pressure member comprises a rotatable outside pressure wheel.

3. A system of claim 2 wherein said rotatable pressure wheel comprises upper and lower disks spaced a distance slightly greater than a thickness of the stamped core strip and an inside rim between an inwardly of an outer periphery of the disks at which pressure is applied to said outside of said base portion of said stator core strip.

4. A system of claim 1 wherein said outside pressure wheel is connected to a drive and the inside pressure wheel is mounted on a freely rotating shaft which is not driven except for rotation of said outside pressure wheel caused by interaction with said driven strip.

5. A system of claim 1 wherein said inside pressure wheel comprises a round base with said teeth extending from said round base transversely.

6. A system of claim 1 wherein a feed wheel connected to a drive is provided which feeds said strip, a drive is provided for said winding arbor, and said outside pressure member comprises a wheel which is connected by a shaft to a drive.

7. A system of claim 1 wherein said teeth of said inside pressure wheel are separated by gaps allowing space for said tangs when said backstop surface is in contact with said inside edge of said strip base portion.

8. A system of claim 1 wherein a ramp is provided after said outside pressure member which angles the bent strip upwardly as it winds around the arbor.

9. A system of claim 1 wherein said guide comprises a guide channel which has a cover plate with a straight slot and a drive member for the strip comprises a wheel having teeth extending down through said slot.

10. A system of claim 9 wherein the floor of said guide channel has a straight slot in line with said straight slot in said cover plate.

11. A system of claim 1 wherein said tangs of said strip extends substantially perpendicularly relative to a longitudinal extent of said base portion.

12. A system of claim 1 wherein a peripheral length of each inside pressure wheel tooth backstop surface substantially corresponds to a length of a spacing between the tangs at the inside edge of the strip base portion.

13. A system for producing a helical stator, comprising:
a stamping die which receives a metal strip and outputs a stator core strip having a base portion and spaced tangs extending from the base portion;
a guide receiving said stator core strip;
a strip feed wheel having teeth engaging the stator core strip to drive the stator core strip in a feed direction to a bending region;
at said bending region an outside pressure member positioned to apply pressure at an outside edge of said strip base portion and with an inside pressure wheel having a plurality of teeth, a backstop surface of said teeth positioned to contact an inside edge of said base portion between adjacent tangs to support said base portion as the strip is being bent by said outside pressure member, said inside pressure wheel having gaps between said teeth for receiving said tangs;
a winding arbor receiving the bent strip to collect multiple turns of said bent strip to form said helical stator; and
a shaft mounted in a bearing holds said inside pressure wheel, an axis of rotation of said shaft being angled away from a vertical orientation such that said backstop surface is substantially vertical.

14. A system of claim 13 wherein said axis of rotation of said shaft is angled at approximately 30° from said vertical.

15. A system for producing a helical stator, comprising:
a stamping die which receives a metal strip and outputs a stator core strip having a base portion and spaced tangs extending from the base portion;
a guide receiving said stator core strip;
a strip feed wheel having teeth engaging the stator core strip to drive the stator core strip in a feed direction to a bending region;
at said bending region an outside pressure member positioned to apply pressure at an outside edge of said strip base portion and with an inside pressure wheel having a plurality of teeth, a backstop surface of said teeth positioned to contact an inside edge of said base portion between adjacent tangs to support said base portion as the strip is being bent by said outside pressure member, said inside pressure wheel having gaps between said teeth for receiving said tangs;
a winding arbor receiving the bent strip to collect multiple turns of said bent strip to form said helical stator; and
said guide comprises a guide channel which has an arc-shaped slot in a floor thereof through which tips of said teeth of said inside pressure wheel extend.

16. A system of claim 15 wherein a cover plate is provided over said guide channel and an arc-shaped slot is provided therein in line with said arc-shaped slot in said floor of said guide channel.

17. A system for producing a helical stator from a stator core strip having a base portion and spaced tangs extending from the base portion, comprising:
a guide receiving said stator core strip;
a strip feed wheel having teeth engaging the stator core strip to drive the stator core strip in a feed direction to a bending region;
at said bending region an outside pressure member positioned to apply pressure at an outside edge of said strip base portion and with an inside pressure wheel having a plurality of teeth, a backstop surface of said teeth positioned to contact an inside edge of said base portion between adjacent tangs to support said base portion as the strip is being bent by said outside pressure member said inside pressure wheel having gaps between said teeth for receiving said tangs; and
a winding arbor receiving the bent strip to collect multiple turns of said bent strip to form said helical stator.

18. A system of claim 17 wherein said inside edge of said base portion between adjacent tangs is substantially straight and said substantially straight inside edge bears against said backstop surface of said teeth.

* * * * *